March 17, 1953     S. G. ANDRES     2,631,686
COLLECTING ELECTRODE

Filed Sept. 25, 1950     3 Sheets-Sheet 1

INVENTOR
STANLEY G. ANDRES

BY Stowell + Evans

ATTORNEY

March 17, 1953     S. G. ANDRES     2,631,686
COLLECTING ELECTRODE
Filed Sept. 25, 1950     3 Sheets-Sheet 2
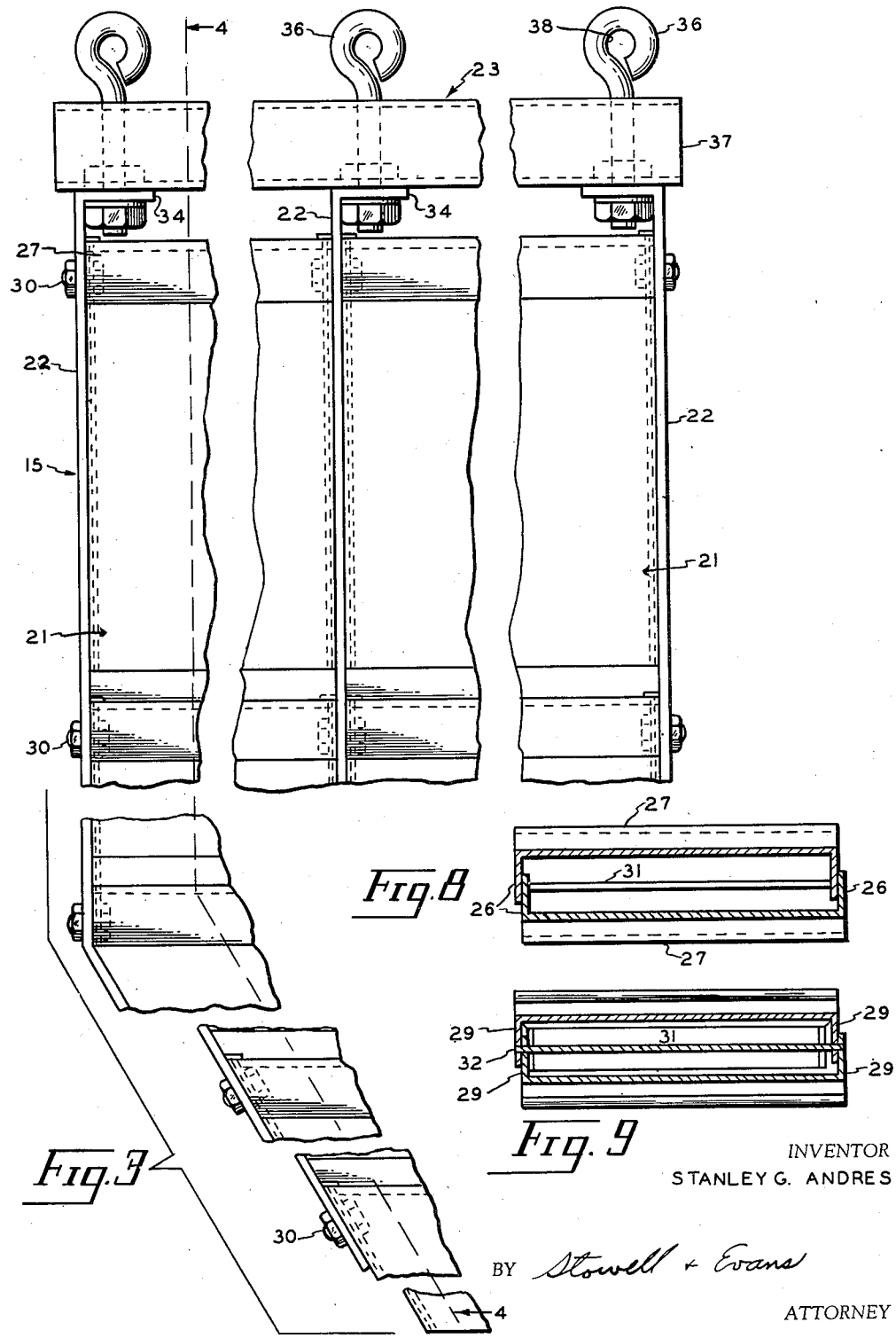
INVENTOR
STANLEY G. ANDRES
BY Stowell & Evans
ATTORNEY March 17, 1953    S. G. ANDRES    2,631,686
COLLECTING ELECTRODE
Filed Sept. 25, 1950    3 Sheets-Sheet 3
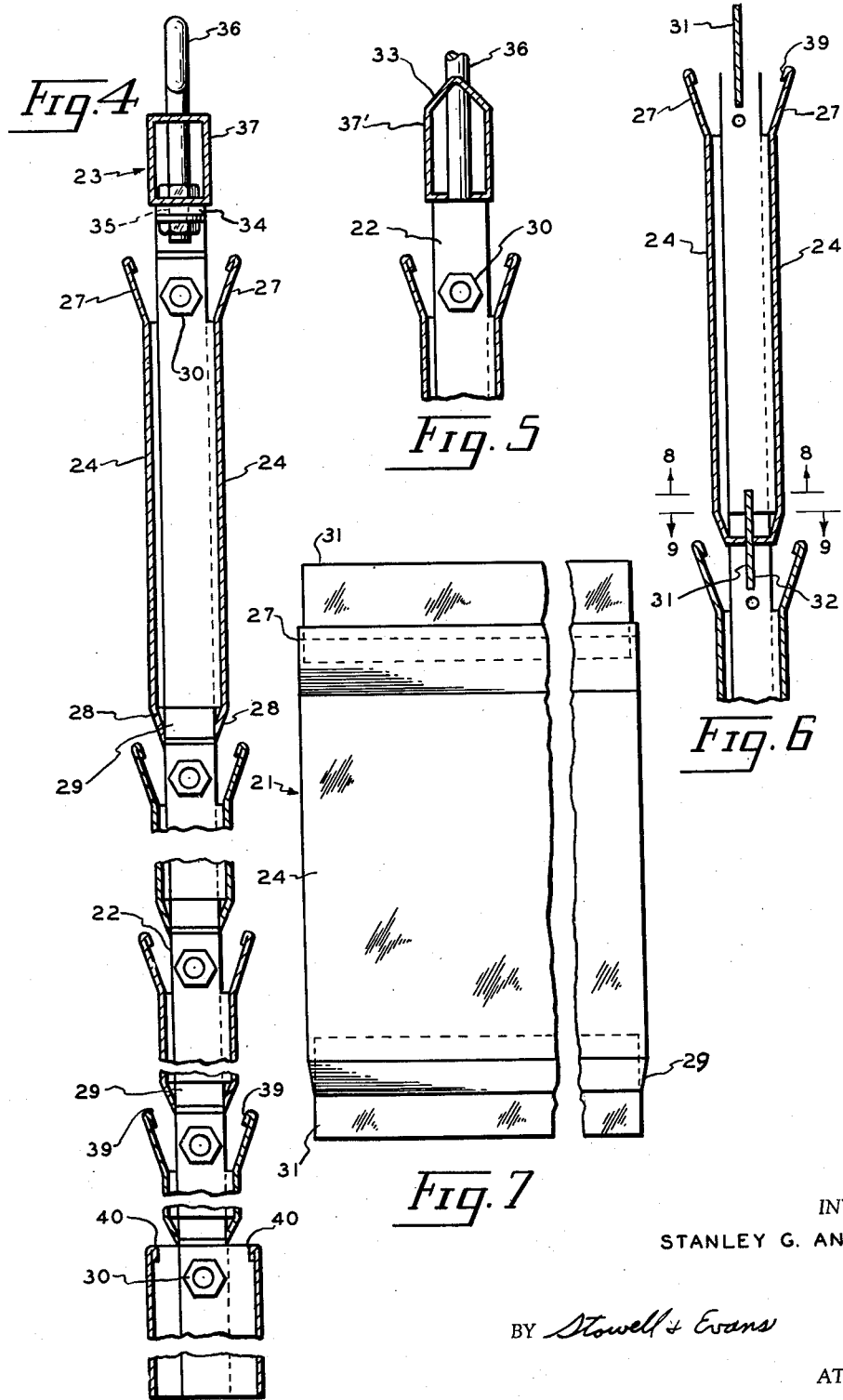
INVENTOR
STANLEY G. ANDRES
BY Stowell & Evans
ATTORNEY Patented Mar. 17, 1953

2,631,686

UNITED STATES PATENT OFFICE 2,631,686

COLLECTING ELECTRODE

Stanley G. Andres, Metuchen, N. J., assignor to Research Corporation, New York, N. Y., a corporation of New York Application September 25, 1950, Serial No. 186,637

5 Claims. (Cl. 183—7)

This invention relates to electrical precipitation apparatus for the separation of suspended materials from gases.

More particularly, the invention relates to collecting electrodes for use in electrical precipitation apparatus intended for use in the precipitation of fine particles or particles of light material which have a tendency to be picked up again by the moving gas stream after having been precipitated on the collecting electrode.

It is a particular object of the invention to provide collecting electrodes comprising a plurality of box-type interlocking sections, encompassed by a supporting frame.

A further object of the invention is to provide such an electrode which may be assembled or dismantled in sections whereby the cost and time required for installation and repairs are greatly diminished.

Another object is to provide a collecting electrode having means for directing the flow of precipitated material within the collecting electrodes, to minimize the resuspension of the precipitated material in the moving gas stream.

A further object is to provide baffle members between the electrode sections to substantially reduce cross currents of gas and thereby avoid sweeping precipitated dust falling within the electrode sections out into the gas stream.

A further object of the invention is to provide novel means of mounting and supporting collecting electrodes of the above described type.

These and other objects and advantages are provided by the collecting electrode of the invention which comprises a plurality of box-like units having parallel extended vertical side members, the outer faces of which provide extended collecting surfaces and vertical end members forming with the side members a vertically extending duct, the upper ends of at least the side members flaring outwardly to provide a receiving funnel along the upper end of the duct and the lower ends of at least the side members projecting inwardly to provide a discharge funnel along the lower end of the duct, and means for independently supporting the electrode units with the discharge funnels and receiving funnels of adjacent units in juxtaposition.

The invention will be more particularly described with reference to the illustrative embodiments of the invention shown in the accompanying drawings in which:

Fig. 3 is an enlarged fragmentary view of an electrode of the invention showing an arrangement of collecting units, both in a vertical and horizontal direction;

Fig. 4 is a section on line 4—4 of Fig. 3;

Fig. 5 is an enlarged fragmentary view of the preferred construction of the electrode suspension means;

Fig. 6 is a fragmentary end section of an electrode showing the baffle members;

Fig. 7 is a side view of the unit shown in Fig. 6;

Fig. 8 is a section on line 8—8 of Fig. 6; and

Fig. 9 is a section on line 9—9 of Fig. 6.

Figures 1, 2:
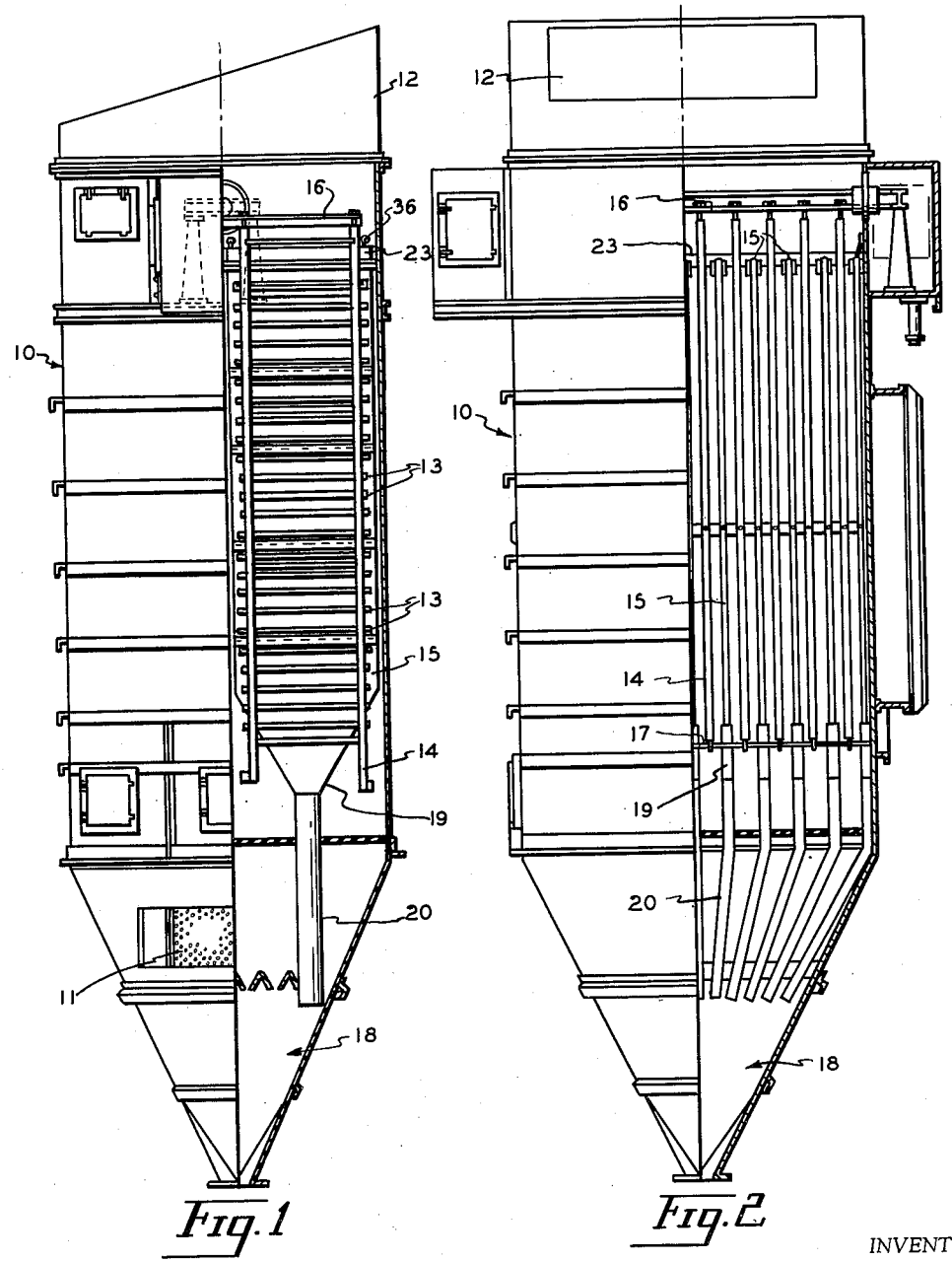
Fig. 1 is a vertical elevation in partial section of a vertical flow precipitator employing collecting electrodes constructed in accordance with the principles of the invention.
Fig. 2 is a vertical elevation of the precipitator of Fig. 1 in partial section along the center line of Fig. 1.

Referring to the drawings 10 is the shell or casing of a vertical flow electrical precipitator having a gas inlet 11 and outlet 12. Within the casing parallel discharge electrodes 13 are shown supported by an electrode supporting frame 14 suspended vertically between the collecting electrodes 15 of the invention.

The upper ends of the discharge electrode frames 14 are connected to the high tension electrical system of the precipitator through busbar and electrode spacer 16, while a retaining frame 17 is shown at the lower ends of the electrodes 13, to secure them from lateral displacement and from swinging from side to side in the gas stream.

Precipitated material is collected at the lower end of the precipitator in a hopper 18. A plurality of dust chutes 19 and 20 direct the precipitated material from the lower ends of the collecting electrodes 15 through the incoming gas stream into the hopper.

The collecting electrodes of the invention comprise a plurality of units or sections 21. In the electrode shown in Fig. 3 of the drawings the electrode comprises two units in a horizontal direction and five units in a vertical direction. However, as many units may be used in both the vertical and horizontal direction as desired. Each of the units 21 are supported by flat bars 22 provided with hanger means 23 adapted to support the electrode within the precipitator.

Each unit 21 of the electrode, as more clearly shown in Figs. 6, 7, 8, and 9 comprises a front and back plate 24, the side faces of which are identical in size and shape and which form when welded together a substantially rectangular box-like structure having funnel-shaped troughs which are coextensive with the upper and lower edges of the box structure.

Each box-like unit is formed by bending the vertical edges 26 of each plate inwardly 90° and warping the upper and lower portions 27 and 28. The upper portions 27 of the plates project outwardly at about 20° to the vertical along the upper edge of the plates and the lower portions 28 project inwardly at about 20° to the vertical along the lower edge of the plate. The lower portions of the plate side edges 26 project inwardly so that the bottom of each unit is "turned in" on all four sides as shown in Fig. 9 of the drawings. The plates 24, formed as above described, are preferably welded together. When the resulting "box" is bolted to the flat bars 22 by bolts 30, it forms one unit of the collecting electrode.

A baffle plate 31 coextensive with the upper edge of the electrode unit is, in the preferred form of the invention, welded to the upper edges 26 midway between the side surfaces of the plates 24. This baffle extends upwardly beyond the upper end of the electrode. Slots 32 centrally disposed in the edges 26 and 29 of the bottom portion of the electrode are adapted to receive the upwardly extending portion of the baffle plate of the next lower electrode unit, whereby the various sections of the collecting electrodes are interlocked one above another. The baffle members, in addition to their function as a guide and interlock between two adjacent units, are positioned in the space where the bottom of one unit discharges precipitated dust into the top of the unit directly under it, thus preventing cross currents of gas from sweeping dust falling inside the electrode out into the gas stream.

It is evident that the baffle member 31 may be carried by the bottom of each unit and the slots 32 may be located in the upper side edges, or that the baffle plate can extend throughout the entire height of the unit within the principles of the invention.

As hereinbefore described, the electrode units are assembled into a completed electrode by bolting each unit one above another and side by side to the flat support bars 22 by bolts 30. Any number of units may be so assembled; likewise any one unit may be removed for repair or replacement without the necessity of dismantling the entire electrode, by simply removing the retaining bolts 30 at the top of each electrode unit.

The uppermost portions of the support bars 22 are provided with angular heads 34 and openings 35 adapted to receive the shank of a hanger bolt 36. In Figs. 3 and 4 a box type fairing 37 is secured between the angular heads 34 of the support bars and the eye 38 of the hanger bolt 36.

Fig. 5 of the drawings shows a modified fairing 37' provided with a V-shaped top structure 33 having better air flow characteristics.

The upper edge projections 27 and the upper edges of the dust chutes 19 may be provided with smoothly rounded edges or the edges 39 and 40, respectively, may be bent inwardly to reduce the tendency toward back-corona discharge and "arcovers" along these edges.

In operation, hot dust-laden gases enter the precipitator through gas inlet 11, and flow upwardly between the dust chutes 19 and 20. These chutes divide the incoming gas into streams, and aid in baffling the gas away from the precipitated dust at the points where the dust enters the chutes from the interior of the collecting electrodes. As the gas passes between the discharge and collecting electrodes 13 and 15, the suspended dust particles are ionized and precipitated upon the outer surfaces of the box-like electrodes. When the collecting electrodes are vibrated or rapped, the precipitated dust falls from the plate surfaces toward the next lower unit and into the funnel-shaped troughs between each unit. These upper troughs and the baffle members 31 direct the falling dust into the interior of the electrode and then into the dust chutes 19 and 20 and the precipitator dust hopper 18.

From the foregoing description, it will be seen that the present invention provides a novel collecting electrode construction whereby the aims, objects and advantages of the invention are fully accomplished.

I claim:

1. A collecting electrode structure comprising a plurality of box-like units having parallel extended vertical side members, the outer faces of which provide extended collecting surfaces and vertical end members forming with the side members a vertically extending duct, the upper ends of at least the side members flaring outwardly to provide a receiving funnel along the upper end of the duct and the lower ends of at least the side members projecting inwardly to provide a discharge funnel along the lower end of the duct, means for independently supporting said units in superposition with the discharge funnels and receiving funnels of adjacent units in juxtaposition, and baffle members extending parallel to the vertical side members centrally of the duct in the adjacent funnel portions of said units.

2. A collecting electrode structure comprising a plurality of box-like units having parallel extended vertical side members, the outer faces of which provide extended collecting surfaces and vertical end members forming with the side members a vertically extending duct, the upper ends of at least the side members flaring outwardly to provide a receiving funnel along the upper end of the duct and the lower ends of at least the side members projecting inwardly to provide a discharge funnel along the lower end of the duct, means for independently supporting said units in superposition with the discharge funnels and receiving funnels of adjacent units in juxtaposition, the end members of said units having vertical slots therein at at least one edge thereof and baffle members extending parallel to the vertical side members centrally of the duct in the adjacent funnel portions of said units.

3. A collecting electrode as defined in claim 2 wherein said means for independently supporting said units comprise parallel bars extending along the end members of the adjacent units.

4. A collecting electrode structure comprising a plurality of box-like units, each unit comprising a pair of parallel extending vertical side members, the outer faces of which provide extended collecting surfaces, the vertical edges of each of said side members bent inwardly 90° to form vertical end members, said end members forming with the side members a vertically extending duct, the upper ends of at least the side members flaring outwardly to provide a receiving funnel along the upper end of the duct and the lower ends of at least the side members projecting inwardly to provide a discharge funnel along the lower end of the duct, means for independently supporting said units in superposition with the discharge funnels and receiving funnels of adjacent units in juxtaposition, and baffle members extending parallel to the vertical side members centrally of the duct in the adjacent funnel portions of said units.

5. A collecting electrode as defined in claim 4 wherein said means for independently supporting said units comprise parallel bars extending along the end members of the adjacent units.

STANLEY G. ANDRES.

REFERENCES CITED

The following references are of record in the file of this patent:

UNITED STATES PATENTS

| Number | Name | Date |
|---|---|---|
| 1,882,949 | Ruder | Oct. 18, 1932 |
| 2,271,597 | Lodge | Feb. 3, 1942 |

FOREIGN PATENTS

| Number | Country | Date |
|---|---|---|
| 529,485 | Great Britain | Nov. 21, 1940 |
| 567,442 | Germany | Jan. 2, 1933 |